United States Patent
Beikmann

(10) Patent No.: US 9,726,139 B2
(45) Date of Patent: Aug. 8, 2017

(54) SYSTEM AND METHOD FOR CONTROLLING A FIRING SEQUENCE OF AN ENGINE TO REDUCE VIBRATION WHEN CYLINDERS OF THE ENGINE ARE DEACTIVATED

(71) Applicant: GM GLOBAL TECHNOLOGY OPERATIONS LLC, Detroit, MI (US)

(72) Inventor: Randall S. Beikmann, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 13/799,129

(22) Filed: Mar. 13, 2013

(65) Prior Publication Data

US 2014/0069381 A1  Mar. 13, 2014

Related U.S. Application Data

(60) Provisional application No. 61/699,216, filed on Sep. 10, 2012.

(51) Int. Cl.
  *F02P 5/00*  (2006.01)
  *F02P 5/15*  (2006.01)
  *F02D 41/00*  (2006.01)

(52) U.S. Cl.
  CPC ............. *F02P 5/15* (2013.01); *F02D 41/0087* (2013.01); *F02D 2200/1004* (2013.01); *F02D 2250/28* (2013.01); *Y02T 10/46* (2013.01)

(58) Field of Classification Search
  USPC ............ 123/406.12, 406.47, 406.11, 406.45, 123/406.46, 406.51, 406.76, 192.1, 192.2, 123/325, 332, 394, 198 F, FOR. 101, 123/FOR. 109, FOR. 111, FOR. 113, 123/FOR. 117, FOR. 118, FOR. 121, 481, 123/321, 322; 701/33.1, 33.7, 33.8, 33.9, 701/34.1, 84, 90, 111, 110, 105, 104, 701/103, 102, 101, 30.2, 31.1, 32.9, 112
  See application file for complete search history.

(56) References Cited

U.S. PATENT DOCUMENTS 3,596,640 A  8/1971  Bloomfield
4,129,034 A  12/1978  Niles et al.
(Continued)

FOREIGN PATENT DOCUMENTS

CN  1573916 A  2/2005
CN  1888407 A  1/2007
(Continued)

OTHER PUBLICATIONS

U.S. Appl. No. 13/798,451, Rayl, Mar. 13, 2013.
(Continued)

*Primary Examiner* — Hung Q Nguyen
*Assistant Examiner* — Ruben Picon-Feliciano

(57) ABSTRACT

A system according to the principles of the present disclosure includes a vibration prediction module and a firing sequence module. The vibration prediction module predicts a modal response of a vehicle based on a firing sequence of an engine when a cylinder of the engine is deactivated. The firing sequence module adjusts the firing sequence of the engine based on the predicted modal response of the vehicle.

24 Claims, 14 Drawing Sheets

(56) References Cited

U.S. PATENT DOCUMENTS

| | | |
|---|---|---|
| 4,172,434 A | 10/1979 | Coles |
| 4,377,997 A | 3/1983 | Staerzl |
| 4,434,767 A | 3/1984 | Kohama et al. |
| 4,489,695 A | 12/1984 | Kohama et al. |
| 4,770,148 A | 9/1988 | Hibino et al. |
| 4,887,216 A | 12/1989 | Ohnari et al. |
| 4,974,563 A | 12/1990 | Ikeda et al. |
| 4,987,888 A | 1/1991 | Funabashi et al. |
| 5,094,213 A | 3/1992 | Dudek et al. |
| 5,226,513 A | 7/1993 | Shibayama |
| 5,278,760 A | 1/1994 | Ribbens et al. |
| 5,357,932 A | 10/1994 | Clinton et al. |
| 5,374,224 A | 12/1994 | Huffmaster et al. |
| 5,377,631 A | 1/1995 | Schechter |
| 5,423,208 A | 6/1995 | Dudek et al. |
| 5,465,617 A | 11/1995 | Dudek et al. |
| 5,496,227 A | 3/1996 | Minowa et al. |
| 5,540,633 A | 7/1996 | Yamanaka et al. |
| 5,553,575 A | 9/1996 | Beck et al. |
| 5,584,266 A | 12/1996 | Motose et al. |
| 5,669,354 A | 9/1997 | Morris |
| 5,692,471 A | 12/1997 | Zhang |
| 5,720,257 A | 2/1998 | Motose et al. |
| 5,778,858 A | 7/1998 | Garabedian |
| 5,813,383 A | 9/1998 | Cummings |
| 5,884,605 A | 3/1999 | Nagaishi et al. |
| 5,909,720 A | 6/1999 | Yamaoka et al. |
| 5,931,140 A | 8/1999 | Maloney |
| 5,934,263 A | 8/1999 | Russ et al. |
| 5,941,927 A | 8/1999 | Pfitz |
| 5,974,870 A | 11/1999 | Treinies et al. |
| 5,975,052 A | 11/1999 | Moyer |
| 5,983,867 A | 11/1999 | Stuber et al. |
| 6,125,812 A | 10/2000 | Garabedian |
| 6,158,411 A | 12/2000 | Morikawa |
| 6,244,242 B1 | 6/2001 | Grizzle et al. |
| 6,247,449 B1 | 6/2001 | Persson |
| 6,272,427 B1 | 8/2001 | Wild et al. |
| 6,286,366 B1 | 9/2001 | Chen et al. |
| 6,295,500 B1 | 9/2001 | Cullen et al. |
| 6,332,446 B1 | 12/2001 | Matsumoto et al. |
| 6,334,425 B1 | 1/2002 | Nagatani et al. |
| 6,355,986 B1 | 3/2002 | Kato et al. |
| 6,360,724 B1 | 3/2002 | Suhre et al. |
| 6,363,316 B1 | 3/2002 | Soliman et al. |
| 6,371,075 B2 | 4/2002 | Koch |
| 6,385,521 B1 | 5/2002 | Ito |
| 6,408,625 B1 | 6/2002 | Woon et al. |
| 6,520,140 B2 | 2/2003 | Dreymuller et al. |
| 6,546,912 B2 | 4/2003 | Tuken |
| 6,588,261 B1 | 7/2003 | Wild et al. |
| 6,619,258 B2 | 9/2003 | McKay et al. |
| 6,622,548 B1 | 9/2003 | Hernandez |
| 6,694,806 B2 | 2/2004 | Kumagai et al. |
| 6,738,707 B2 | 5/2004 | Kotwicki et al. |
| 6,754,577 B2 | 6/2004 | Gross et al. |
| 6,760,656 B2 | 7/2004 | Matthews et al. |
| 6,850,831 B2 | 2/2005 | Buckland et al. |
| 6,909,961 B2 | 6/2005 | Wild et al. |
| 6,978,204 B2 | 12/2005 | Surnilla et al. |
| 6,980,902 B2 | 12/2005 | Nakazawa |
| 6,981,492 B2 | 1/2006 | Barba et al. |
| 6,983,737 B2 | 1/2006 | Gross et al. |
| 7,003,390 B2 | 2/2006 | Kaga |
| 7,024,301 B1 | 4/2006 | Kar et al. |
| 7,025,041 B2 | 4/2006 | Abe et al. |
| 7,028,661 B1 | 4/2006 | Bonne et al. |
| 7,032,545 B2 | 4/2006 | Lewis et al. |
| 7,032,581 B2 | 4/2006 | Gibson et al. |
| 7,044,101 B1 | 5/2006 | Duty et al. |
| 7,063,062 B2 | 6/2006 | Lewis et al. |
| 7,066,121 B2 | 6/2006 | Michelini et al. |
| 7,066,136 B2 | 6/2006 | Ogiso |
| 7,069,718 B2 | 7/2006 | Surnilla et al. |
| 7,069,773 B2 | 7/2006 | Stempnik et al. |
| 7,086,386 B2 | 8/2006 | Doering |
| 7,100,720 B2 | 9/2006 | Ishikawa |
| 7,111,612 B2 | 9/2006 | Michelini et al. |
| 7,140,355 B2 | 11/2006 | Michelini et al. |
| 7,159,568 B1 | 1/2007 | Lewis et al. |
| 7,174,713 B2 | 2/2007 | Nitzke et al. |
| 7,174,879 B1 | 2/2007 | Chol et al. |
| 7,200,486 B2 | 4/2007 | Tanaka et al. |
| 7,203,588 B2 | 4/2007 | Kaneko et al. |
| 7,231,907 B2 | 6/2007 | Bolander et al. |
| 7,278,391 B1 | 10/2007 | Wong et al. |
| 7,292,231 B2 | 11/2007 | Kodama et al. |
| 7,292,931 B2 | 11/2007 | Davis et al. |
| 7,319,929 B1 | 1/2008 | Davis et al. |
| 7,363,111 B2 | 4/2008 | Vian et al. |
| 7,367,318 B2 | 5/2008 | Moriya et al. |
| 7,415,345 B2 | 8/2008 | Wild |
| 7,440,838 B2 | 10/2008 | Livshiz et al. |
| 7,464,676 B2 | 12/2008 | Wiggins et al. |
| 7,472,014 B1 | 12/2008 | Albertson et al. |
| 7,497,074 B2 | 3/2009 | Surnilla et al. |
| 7,499,791 B2 | 3/2009 | You et al. |
| 7,503,312 B2 | 3/2009 | Surnilla et al. |
| 7,509,201 B2 | 3/2009 | Bolander et al. |
| 7,555,896 B2 | 7/2009 | Lewis et al. |
| 7,577,511 B1 | 8/2009 | Tripathi et al. |
| 7,581,531 B2 | 9/2009 | Schulz |
| 7,614,384 B2 | 11/2009 | Livshiz et al. |
| 7,620,188 B2 | 11/2009 | Inoue et al. |
| 7,621,262 B2 | 11/2009 | Zubeck |
| 7,634,349 B2 | 12/2009 | Senft et al. |
| 7,685,976 B2 | 3/2010 | Marriott |
| 7,785,230 B2 | 8/2010 | Gibson et al. |
| 7,836,866 B2 | 11/2010 | Luken et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,946,263 B2 | 5/2011 | O'Neill et al. |
| 7,954,474 B2 | 6/2011 | Tripathi et al. |
| 8,050,841 B2 | 11/2011 | Costin et al. |
| 8,108,132 B2 | 1/2012 | Reinke |
| 8,135,410 B2 | 3/2012 | Forte |
| 8,145,410 B2 | 3/2012 | Berger et al. |
| 8,146,565 B2 | 4/2012 | Leone et al. |
| 8,272,367 B2 | 9/2012 | Shikama et al. |
| 8,347,856 B2 | 1/2013 | Leone et al. |
| 8,402,942 B2 | 3/2013 | Tripathi et al. |
| 8,473,179 B2 | 6/2013 | Whitney et al. |
| 8,646,430 B2 | 2/2014 | Kinoshita |
| 8,646,435 B2 | 2/2014 | Dibble et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,020,735 B2 | 4/2015 | Tripathi et al. |
| 9,140,622 B2 | 9/2015 | Beikmann |
| 9,200,575 B2 | 12/2015 | Shost |
| 9,212,610 B2 | 12/2015 | Chen et al. |
| 9,222,427 B2 | 12/2015 | Matthews et al. |
| 2001/0007964 A1 | 7/2001 | Poljansek et al. |
| 2002/0038654 A1 | 4/2002 | Sasaki et al. |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0101961 A1 | 6/2003 | Foster |
| 2003/0116130 A1 | 6/2003 | Kisaka et al. |
| 2003/0123467 A1 | 7/2003 | Du et al. |
| 2003/0131820 A1* | 7/2003 | Mckay et al. ............ 123/198 F |
| 2003/0172892 A1 | 9/2003 | Glugla et al. |
| 2003/0172900 A1 | 9/2003 | Boyer et al. |
| 2003/0217877 A1 | 11/2003 | Tatara et al. |
| 2003/0236599 A1 | 12/2003 | Saito et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |

(56) References Cited

U.S. PATENT DOCUMENTS

| | | |
|---|---|---|
| 2004/0138027 A1 | 7/2004 | Rustige et al. |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |
| 2005/0205060 A1* | 9/2005 | Michelini .......... F01L 1/36 123/432 |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1* | 2/2008 | Lewis .......... B60W 10/06 123/179.3 |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118965 A1 | 5/2009 | Livshiz et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1* | 7/2009 | Reinke .......... 701/111 |
| 2009/0204312 A1 | 8/2009 | Moriya |
| 2009/0229562 A1 | 9/2009 | Ramappan et al. |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0057283 A1 | 3/2010 | Worthing et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0192925 A1 | 8/2010 | Sadakane |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1 | 5/2011 | Livshiz et al. |
| 2011/0144883 A1 | 6/2011 | Rollinger et al. |
| 2011/0178693 A1 | 7/2011 | Chang et al. |
| 2011/0208405 A1* | 8/2011 | Tripathi .......... F02D 17/02 701/102 |
| 2011/0213526 A1 | 9/2011 | Giles et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0116647 A1 | 5/2012 | Pochner et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0184949 A1 | 7/2013 | Saito et al. |
| 2013/0289853 A1 | 10/2013 | Serrano |
| 2013/0333663 A1 | 12/2013 | Chen et al. |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 A | 8/2011 |

OTHER PUBLICATIONS

U.S. Appl. No. 13/798,351, Rayl, Mar. 13, 2013.

(56) References Cited

OTHER PUBLICATIONS

U.S. Appl. No. 13/798,586, Rayl et al., Mar. 13, 2013.
U.S. Appl. No. 13/798,590, Brennan et al., Mar. 13, 2013.
U.S. Appl. No. 13/798,536, Matthews et al., Mar. 13, 2013.
U.S. Appl. No. 13/798,435, Matthews, Mar. 13, 2013.
U.S. Appl. No. 13/798,471, Matthews et al., Mar. 13, 2013.
U.S. Appl. No. 13/798,737, Beikmann, Mar. 13, 2013.
U.S. Appl. No. 13/798,701, Burleigh et al., Mar. 13, 2013.
U.S. Appl. No. 13/798,518, Beikmann, Mar. 13, 2013.
U.S. Appl. No. 13/798,540, Beikmann, Mar. 13, 2013.
U.S. Appl. No. 13/798,574, Verner, Mar. 13, 2013.
U.S. Appl. No. 13/799,181, Beikmann, Mar. 13, 2013.
U.S. Appl. No. 13/799,116, Brennan, Mar. 13, 2013.
U.S. Appl. No. 13/798,624, Brennan et al., Mar. 13, 2013.
U.S. Appl. No. 13/798,384, Burtch, Mar. 13, 2013.
U.S. Appl. No. 13/798,775, Phillips, Mar. 13, 2013.
U.S. Appl. No. 13/798,400, Phillips, Mar. 13, 2013.
U.S. Appl. No. 14/211,389, filed Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.
Glossary of Judicial Claim Constructions in the Electronics, Computer and Business Method Arts. Public Patent Foundation. (2010).

* cited by examiner

| | 0° | 90° | 180° | | 270° | | 360° | | 450° | | 540° | | 630° | | 720° | | 810° | |
|---|---|---|---|---|---|---|---|---|---|---|---|---|---|---|---|---|---|---|
| 1202 | 0 | 1 | 2 | | 3 | | 4 | | 5 | | 6 | | 7 | | 8 | | 9 | |
| 1204 | 1228 1230 | 1228 1230 | 1228 | 1230 | 1228 | 1230 | 1228 | 1230 | 1228 | 1230 | 1228 | 1230 | 1228 | 1230 | 1228 | 1230 | 1228 | 1230 |
| 1206 | | 0.064 0.213 | | | | | | | | | | | | | | | | |
| 1208 | | 0.105 -0.174 | -0.064 0.213 | | | | | | | | | | | | | | | |
| 1210 | | -0.253 0.024 | 0.105 -0.174 | | -0.064 0.213 | | | | | | | | | | | | | |
| 1212 | | 0.195 0.263 | -0.253 0.024 | | 0.105 -0.174 | | -0.064 0.213 | | | | | | | | | | | |
| 1214 | | 0.221 -0.370 | 0.195 0.263 | | -0.253 0.024 | | 0.105 -0.174 | | -0.064 0.213 | | | | | | | | | |
| 1216 | | -0.494 -0.132 | 0.221 -0.370 | | 0.195 0.263 | | -0.253 0.024 | | 0.105 -0.174 | | -0.064 0.213 | | | | | | | |
| 1218 | | 0.001 0.492 | -0.494 -0.132 | | 0.221 -0.370 | | 0.195 0.263 | | -0.253 0.024 | | 0.105 -0.174 | | -0.064 0.213 | | | | | |
| 1220 | | 0.220 -0.203 | 0.001 0.492 | | -0.494 -0.132 | | 0.221 -0.370 | | 0.195 0.263 | | -0.253 0.024 | | 0.105 -0.174 | | -0.064 0.213 | | | |
| 1222 | | -0.070 0.113 | -0.290 0.315 | | -0.291 -0.177 | | 0.203 -0.045 | | -0.017 0.325 | | -0.212 0.062 | | 0.041 0.038 | | -0.064 0.213 | | 0.000 0.000 |
| 1224 | | 0.902 0.562 | -0.134 1.008 | | -1.282 0.314 | | -0.892 -1.207 | | 0.672 -1.180 | | 1.018 0.106 | | 0.264 0.736 | | -0.476 -0.952 | | |
| 1226 | 1.000 -0.500 | 0.831 0.674 | -0.424 1.323 | | -1.574 0.137 | | -0.689 -1.252 | | 0.655 -0.855 | | 0.806 0.168 | | 0.305 0.774 | | -0.540 0.844 | | -0.952 -0.018 |

FIG. 12

SYSTEM AND METHOD FOR CONTROLLING A FIRING SEQUENCE OF AN ENGINE TO REDUCE VIBRATION WHEN CYLINDERS OF THE ENGINE ARE DEACTIVATED

CROSS-REFERENCE TO RELATED APPLICATIONS

This application claims the benefit of U.S. Provisional Application No. 61/699,216, filed on Sep. 10, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to systems and methods for controlling a firing sequence of an engine to reduce vibration when cylinders of the engine are deactivated.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Under some circumstances, one or more cylinders of an engine may be deactivated to decrease fuel consumption. For example, one or more cylinders may be deactivated when the engine can produce a requested amount of torque while the one or more cylinders are deactivated. Deactivation of a cylinder may include disabling opening of intake and exhaust valves of the cylinder and disabling fueling of the cylinder.

SUMMARY

A system according to the principles of the present disclosure includes a vibration prediction module and a firing sequence module. The vibration prediction module predicts a modal response of a vehicle based on a firing sequence of an engine when a cylinder of the engine is deactivated. The firing sequence module adjusts the firing sequence of the engine based on the predicted modal response of the vehicle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 12 is a table illustrating an example vehicle vibration response according to the principles of the present disclosure.

DETAILED DESCRIPTION

Figure 1:
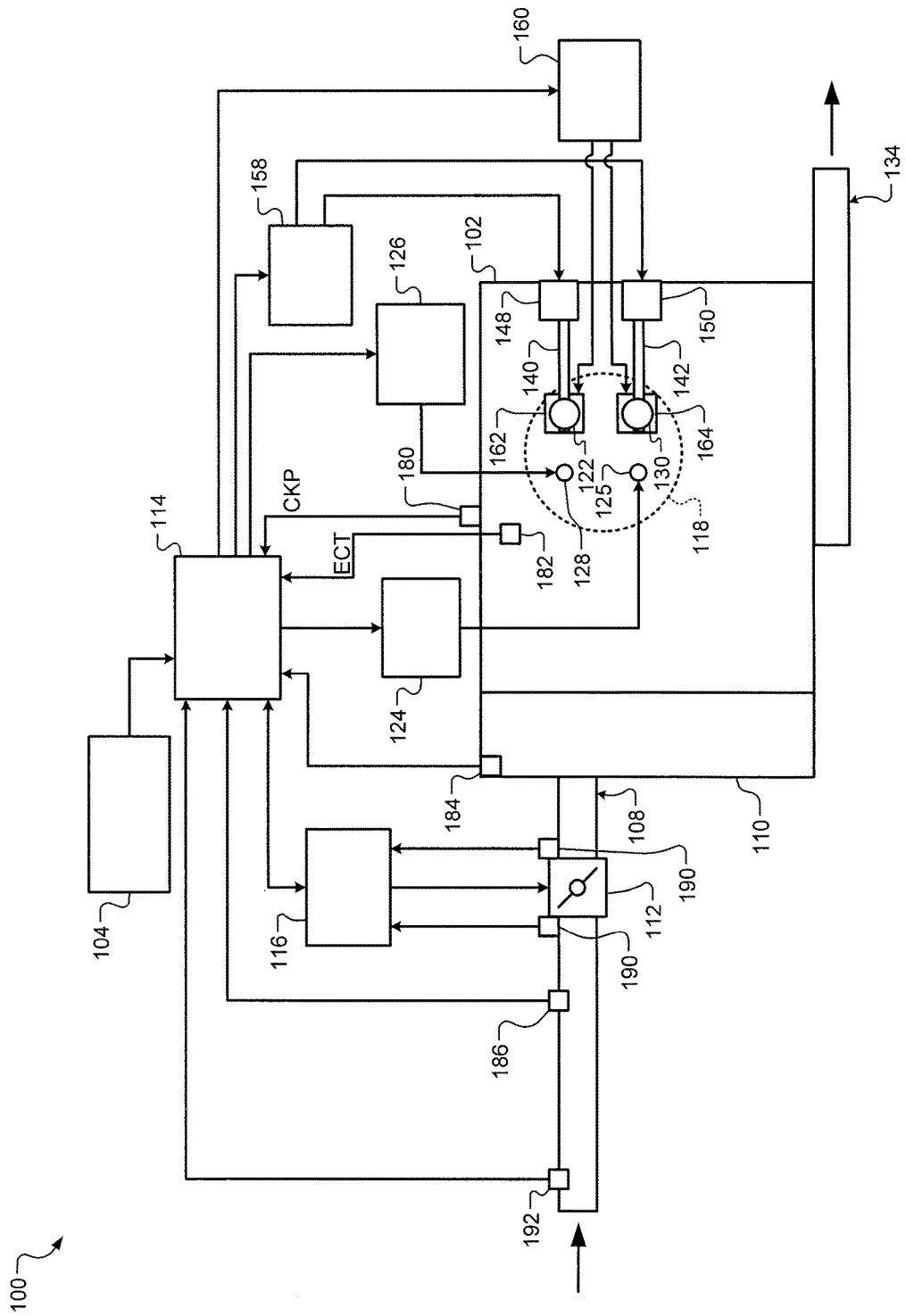
FIG. 1 is a functional block diagram of an example engine system according to the principles of the present disclosure.

When a cylinder deactivation system deactivates cylinders of an engine, a firing sequence of the engine may be adjusted in a random or periodic manner to achieve a desired number of deactivated cylinders and/or to change which cylinders are deactivated. The firing sequence may be adjusted without regard to the noise and vibration performance of a vehicle. Thus, a driver may perceive an increase in noise and vibration, and the applicability of the cylinder deactivation system may be limited.

A control system and method according to the principles of the present disclosure optimizes a firing sequence of an engine when cylinders of the engine are deactivated to strike a balance between torque output, fuel economy, and vibration. Vibration responses are predicted for multiple firing sequence options that achieve a desired quantity of deactivated cylinders. One of the firing sequence options is selected based on the predicted vibration responses of the firing sequence options.

The vibration responses resulting from a firing sequence may be predicted by predicting vibration modal responses to torque pulses associated with cylinders in the firing sequence, determining the timing of the modal responses, and summing these modal responses. Torque pulses may be estimated for firing cylinders and non-firing cylinders in a firing sequence. Each torque pulse may correspond to a predetermined number (e.g., two) of crankshaft revolutions. The responses of multiple (e.g., five) vibration modes to each torque pulse may be predicted based on modal characteristics of a vehicle, including its modal frequencies and damping ratios, which may be predetermined and stored in a table.

A vibration mode is characterized by its modal frequency and its modal shape or direction (e.g., bending, torsional). At each location on a vehicle, the amplitude of the vibration in each direction is directly proportional to the modal response. Thus, the amplitude of vibration in each direction may be determined by multiplying the modal response by a multiplier, which may be unique for each direction. The total vibration at a given location on a vehicle and in a given direction may be predicted by summing the contributions of each mode.

The modal response of a future firing sequence may be affected by the modal responses of previous firing sequences. Thus, the modal responses of previous firing sequences may be summed to yield a present modal response, and the predicted modal response of a future firing sequence may be added to the present modal response to yield a total vibration response. The total vibration response of each firing sequence option may be expressed as a single value, such as a maximum peak-to-peak value, which may be used to select one of the firing sequence options.

Predicting the vibration response of a vehicle on a modal basis as described above reduces the number of calculations required to predict the vibration response of each firing sequence option. In turn, the number of firing sequence options evaluated within a given period may be increased using the same amount of processing power. Increasing the number of firing sequence options evaluated may improve the vibration performance of the vehicle.

Referring now to FIG. 1, an engine system 100 includes an engine 102 that combusts an air/fuel mixture to produce drive torque for a vehicle. The amount of drive torque produced by the engine 102 is based on driver input from a driver input module 104. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. For illustration purposes, a single representative cylinder 118 is shown. However, the engine 102 may include multiple cylinders. For example, the engine 102 may include 2, 3, 4, 5, 6, 8, 10, and/or 12 cylinders. The ECM 114 may deactivate one or more of the cylinders, which may improve fuel economy under certain engine operating conditions.

The engine 102 may operate using a four-stroke cycle. The four strokes include an intake stroke, a compression stroke, a combustion stroke, and an exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 125 to control the amount of fuel provided to the cylinder to achieve a desired air/fuel ratio. The fuel injector 125 may inject fuel directly into the cylinder 118 or into a mixing chamber associated with the cylinder 118. The fuel actuator module 124 may halt fuel injection into cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114. The spark ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. A firing event causes combustion in a cylinder when an air/fuel mixture is provided to the cylinder (e.g., when the cylinder is active). The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. As the combustion of the air/fuel mixture drives the piston down, the piston moves from TDC to its bottommost position, referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. The ECM 114 may disable opening of the intake and exhaust valves 122, 130 of cylinders that are deactivated. A phaser actuator module 158 may control the intake cam phaser 148 and the exhaust cam phaser 150 based on signals from the ECM 114. When implemented, variable valve lift (not shown) may also be controlled by the phaser actuator module 158.

The ECM 114 may deactivate the cylinder 118 by instructing a valve actuator module 160 to deactivate opening of the intake valve 122 and/or the exhaust valve 130. The valve actuator module 160 controls an intake valve actuator 162 that opens and closes the intake valve 122. The valve actuator module 160 controls an exhaust valve actuator 164 that opens and closes the exhaust valve 130. In one example, the valve actuators 162, 164 include solenoids that deactivate opening of the valves 122, 130 by decoupling cam followers from the camshafts 140, 142. In another example, the valve actuators 162, 164 are electromagnetic or electro-hydraulic actuators that control the lift, timing, and duration of the valves 122, 130 independent from the camshafts 140, 142. In this example, the camshafts 140, 142, the cam phasers 148, 150, and the phaser actuator module 158 may be omitted.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

Figure 2:
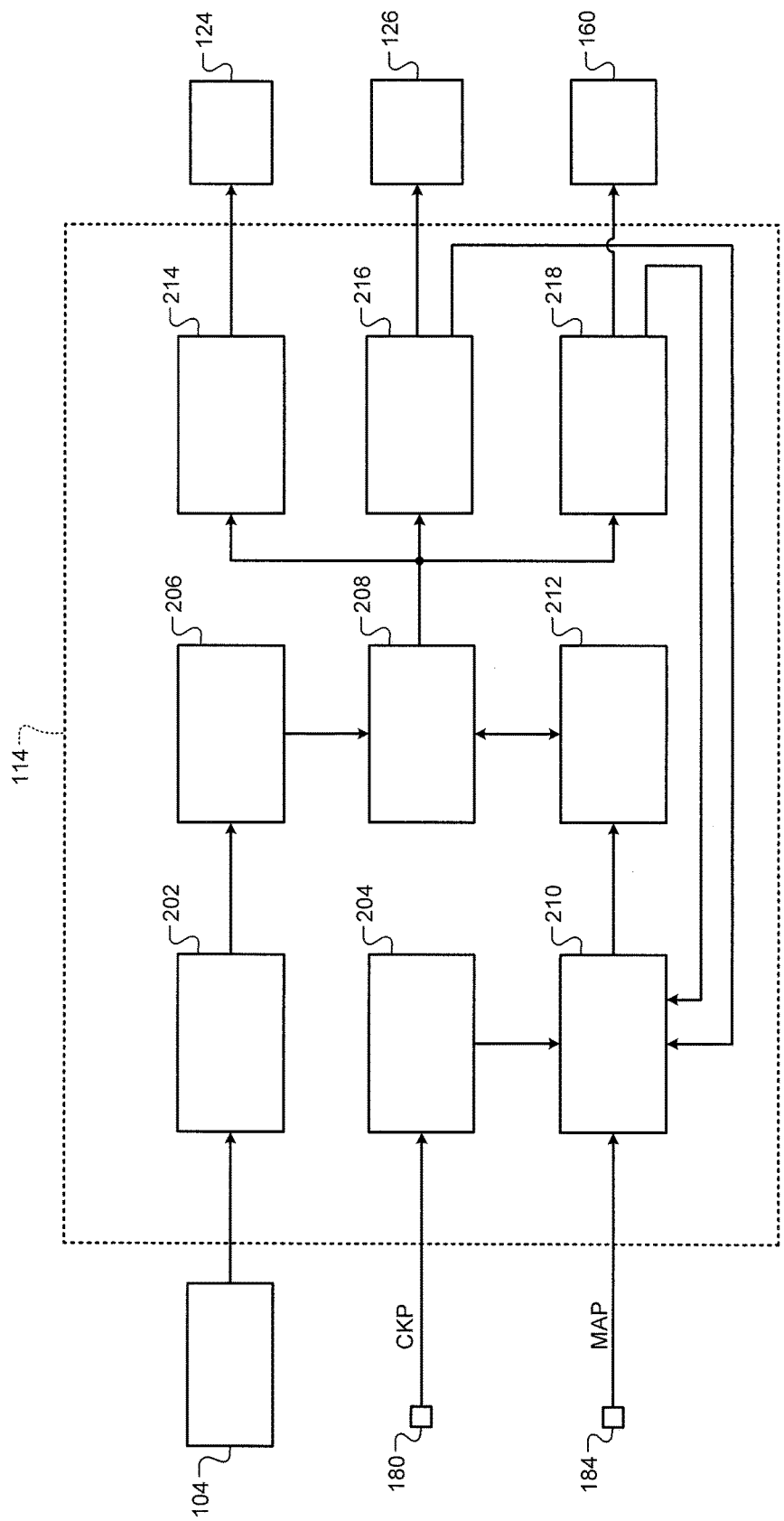
FIG. 2 is a functional block diagram of an example control system according to the principles of the present disclosure.

Referring now to FIG. 2, an example implementation of the ECM 114 includes a torque request module 202, an engine speed module 204, and a cylinder deactivation module 206. The torque request module 202 determines a driver torque request based on the driver input from the driver input module 104. The driver input may be based on a position of an accelerator pedal. The driver input may also be based on an input from a cruise control system, which may be an adaptive cruise control system that varies vehicle speed to maintain a predetermined following distance. The torque request module 202 may store one or more mappings of accelerator pedal position to desired torque, and may determine the driver torque request based on a selected one of the mappings. The torque request module 202 outputs the driver torque request.

The engine speed module 204 determines engine speed. The engine speed module 204 may determine the engine speed based on input received from the CKP sensor 180. The engine speed module 204 may determine the engine speed based on an amount of crankshaft rotation between tooth detections and the corresponding period. The engine speed module 204 outputs the engine speed.

The cylinder deactivation module 206 deactivates cylinders in the engine 102 based on the driver torque request. The cylinder deactivation module 206 may deactivate one or more cylinders when the engine 102 can satisfy the driver torque request while the cylinders are deactivated. The cylinder deactivation module 206 may reactivate the cylinders when the engine 102 cannot satisfy the driver torque request while the cylinders are deactivated. The cylinder deactivation module 206 outputs the quantity of deactivated cylinders and/or the quantity of active cylinders.

A firing sequence module 208 determines a firing sequence of the cylinders in the engine 102. The firing sequence module 208 may assess and/or adjust the firing sequence after each engine cycle. Alternatively, the firing sequence module 208 may assess and/or adjust the firing sequence before each firing event in the engine 102. An engine cycle may correspond to 720 degrees of crankshaft rotation. A firing sequence may include one or more cylinder events. For example, a firing sequence may include 4, 5, 8, or 16 cylinder events. A cylinder event may refer to a firing event and/or a crank angle increment during which spark is generated in a cylinder when the cylinder is active. The firing sequence module 208 outputs the firing sequence.

The firing sequence module 208 may change the firing sequence from one engine cycle to the next engine cycle to change the quantity of active cylinders without changing the order in which cylinders are firing. For example, for an 8-cylinder engine having a firing order of 1-8-7-2-6-5-4-3, a firing sequence of 1-8-7-2-5-3 may be specified for one engine cycle, and a firing sequence of 1-7-2-5-3 may be specified for the next engine cycle. This decreases the quantity of active cylinders from 6 to 5.

The firing sequence module 208 may change the quantity of active cylinders from one engine cycle to the next engine cycle based on instructions received from the cylinder deactivation module 206. The cylinder deactivation module 206 may alternate the quantity of active cylinders between two integers to achieve an effective cylinder count that is equal to the average value of the two integers. For example, the cylinder deactivation module 206 may alternate the quantity of active cylinders equally between 5 and 6, resulting in an effective cylinder count of 5.5.

The cylinder deactivation module 206 may assign a weighting factor to each active cylinder quantity based on the number of engine cycles corresponding to each active cylinder quantity. The cylinder deactivation module 206 may then determine the effective cylinder count based on a weighted average of the active cylinder quantities. For example, the cylinder deactivation module 206 may adjust the quantity of active cylinders to 5 for two consecutive engine cycles and then change the quantity of active cylinders to 6 for one engine cycle. In this case, the cylinder deactivation module 206 may assign a weighting factor of 2 to the active cylinder quantity of 5 and a weighting factor of 1 to the active cylinder quantity of 6. The cylinder deactivation module 206 may then determine that the effective cylinder count of the three engine cycles is 5.33.

The firing sequence module 208 may change the firing sequence from one engine cycle to the next engine cycle to change which cylinders are firing, and thereby change which cylinders are active, without changing the quantity of active cylinders. For example, when three cylinders of the 8-cylinder engine described above are deactivated, a firing sequence of 1-7-2-5-3 may be specified for one engine cycle, and a firing sequence of 8-2-6-4-3 may be specified for the next engine cycle. This deactivates cylinders 1, 7, and 5 and reactivates cylinders 8, 6, and 4.

A torque pulse module 210 estimates torque pulses of firing cylinders and non-firing cylinders. A vibration prediction module 212 predicts a vibration response of the vehicle based on the firing sequence and the torque pulses. The vibration prediction module 212 may predict the vibration responses of multiple firing sequence options and output the predicted vibrations. The firing sequence module 208 and/or the vibration prediction module 212 may determine the firing sequence options based on the quantity of deactivated cylinders output by the cylinder deactivation module 206.

The firing sequence module 208 may select one of the firing sequence options based on the predicted vibrations. The firing sequence module 208 may optimize the firing sequence to satisfy the driver torque request while maximizing fuel economy and minimizing vibration. The firing sequence module 208 outputs the firing sequence, as optimized, to a fuel control module 214, a spark control module 216, and a valve control module 218.

The torque pulse module 210 estimates the torque pulses based on engine operating conditions such as the manifold pressure and the engine speed. In various implementations, the torque pulse module 210 may estimate the torque pulses based on spark timing and valve timing, which may be received from the spark control module 216 and the valve control module 218, respectively. When estimating the torque pulses, the torque pulse module 210 may assume that each firing cylinder produces the same torque pulse and each non-firing cylinder produces the same torque pulse despite differences in location (e.g., relative to the intake manifold 110).

The duration of each torque pulse may correspond to a period of a thermodynamic cycle within a cylinder. For example, for a four-stroke engine, the duration of each torque pulse may correspond to two crankshaft revolutions. The torque pulses may start before an intake stroke when a piston in a cylinder is at TDC. Alternatively, the torque pulses may start before an exhaust stroke when a piston in a cylinder is at BDC, which may correspond to the time when the intake and exhaust valves 122, 130 are deactivated.

The vibration prediction module 212 may predict the response of one or more (e.g. 5) vibration modes of a vehicle to each torque pulse in a firing sequence. The vibration prediction module 212 may predict the response of each mode to each torque pulse based on modal characteristics of a vehicle, including its modal frequencies and damping ratios. The vibration prediction module 212 may sum the modal responses to each torque pulse to yield a total vibration response of the vehicle.

The vibration prediction module 212 may predict the response of each mode to each torque pulse based on a predetermined relationship between crankshaft torque and modal response. The predetermined relationship may be developed through laboratory testing and/or computer-aided simulation, and may be embodied in an equation and/or a lookup table. In various implementations, the predetermined relationship may be embodied as an impulse response function such as a unit impulse response function.

The vibration prediction module 212 may predict the vibration response at one or more locations. For example, the vibration prediction module 212 may predict the vibration response at a driver interface component such as a driver seat, a steering wheel, or a pedal. The vibration prediction module 212 may predict the vibration response in one or more directions. For example, the vibration prediction module 212 may predict the vibration response in the longitudinal, lateral, and vertical directions.

A vibration mode is characterized by its modal frequency and its modal shape or direction (e.g., bending, torsional). The amplitude of the vibration response at each location and in each direction is directly proportional to the modal response. Thus, the vibration prediction module 212 may predict the amplitude of vibration at each location and in each direction by determining the product of the modal response and a multiplier, which may be unique for each location and each direction.

The vibration prediction module 212 may predict the response of each mode to each torque pulse in a firing sequence by convolving each torque pulse with a unit impulse modal response function. The vibration prediction module 212 may predict the response of each mode to a firing sequence by determining the timing of the modal response to each torque pulse in the firing sequence and summing portions of the modal responses that overlap in time. The vibration prediction module 212 may determine the timing of the modal responses based on the crankshaft position and the engine speed.

The modal response of a future firing sequence may be affected by the modal responses of previous firing sequences since the modal responses may overlap in time. Thus, the vibration prediction module 212 may sum the modal responses of previous firing sequences to yield a present modal response and add the modal response of the future firing sequence to the present modal response to yield a total modal response.

A modal response may be characterized by its magnitude and phase, which may be represented by a complex vector that rotates once per vibration period. The magnitude of a modal response decays according to its damping ratio. Thus, once the magnitude and phase of the present modal response is known, the manner in which the present modal response decays may be predicted based on its phase progression and magnitude decay. The phase progression and magnitude decay may be determined based on the modal characteristics of the vehicle.

The total vibration modal response may be expressed in terms of a single value. For example, the total vibration modal response may be expressed as a maximum peak-to-peak value of the total vibration modal response. Additionally or alternatively, the total vibration modal response may be expressed as a ratio of the total vibration modal response to a predetermined vibration modal response. Various other vibration criteria may be used to quantify the total vibration modal response. The vibration prediction module 212 may output the firing sequence options and the corresponding total vibration responses.

The vibration prediction module 212 may predict the vibration responses of the firing sequence options and the firing sequence module 208 may select one of the firing sequence options at a first time. A first period between the first time and a second time corresponding to the start of a cylinder event may be adjusted to allow the ECM 114 to activate or deactivate cylinders according to the selected firing sequence option. For example, the first period may be adjusted based on an amount of time required to deactivate the intake and exhaust valves 122, 130.

The fuel control module 214 instructs the fuel actuator module 124 to provide fuel to cylinders of the engine 102 according to the firing sequence. The spark control module 216 instructs the spark actuator module 126 to generate spark in cylinders of the engine 102 according to the firing sequence. The spark control module 216 may output a signal indicating which of the cylinders is next in the firing sequence. The spark control module 216 may output the spark timing of the firing cylinders to the torque pulse module 210. The valve control module 218 instructs the valve actuator module 160 to open intake and exhaust valves of the engine 102 according to the firing sequence. The valve control module 218 may output the valve timing of the firing cylinders to the torque pulse module 210.

In various implementations, for each of the firing sequence options, the vibration prediction module 212 may predict vibration responses for multiple spark timings and multiple manifold pressures. The spark timings and the manifold pressures may be selected from a predetermined range of spark timings and a predetermined range of manifold pressures, respectively. The vibration prediction module 212 may output the firing sequence options, the spark timings, the manifold pressures, and the vibration responses corresponding to each combination of firing sequence option, spark timing, and manifold pressure.

The firing sequence module 208 may optimize the firing sequence, the spark timing, and the manifold pressure to satisfy the driver torque request while maximizing fuel economy and minimizing vibration. The firing sequence module 208 may output the firing sequence, the spark timing, and the manifold pressure, as optimized. The spark control module 216 may then output the optimized spark timing to the spark actuator module 126. In addition, a throttle control module (not shown) and the valve control module 218 may adjust a throttle area and the valve timing, respectively, based on the optimized firing sequence and/or the optimized manifold pressure. The throttle control module may output the throttle area to the throttle actuator module 116. Furthermore, the fuel control module 214 may control the injection amount and/or the injection timing based on the optimized firing sequence.

In various implementations, an optimization module (not shown) may optimize the firing sequence, the spark timing, and the manifold pressure to satisfy the driver torque request while maximizing fuel economy. The optimization module may output the firing sequence, the spark timing, and the manifold pressure, as optimized. The optimization module may perform the optimization and output the results instead of the firing sequence module 208. The optimization module may receive the vibration responses corresponding to each combination of firing sequence option, spark timing, and manifold pressure from the vibration prediction module 212. The optimization module may receive the torque output corresponding to each combination and the fuel economy corresponding to each combination from a torque estimation module (not shown) and a fuel economy module (not shown), respectively. The fuel economy module may estimate the fuel economy of the vehicle for each combination of firing sequence option, spark timing, and manifold pressure. The torque estimation module may estimate the torque output of the engine 102 for each combination of firing sequence option, spark timing, and manifold pressure.

Figure 3:
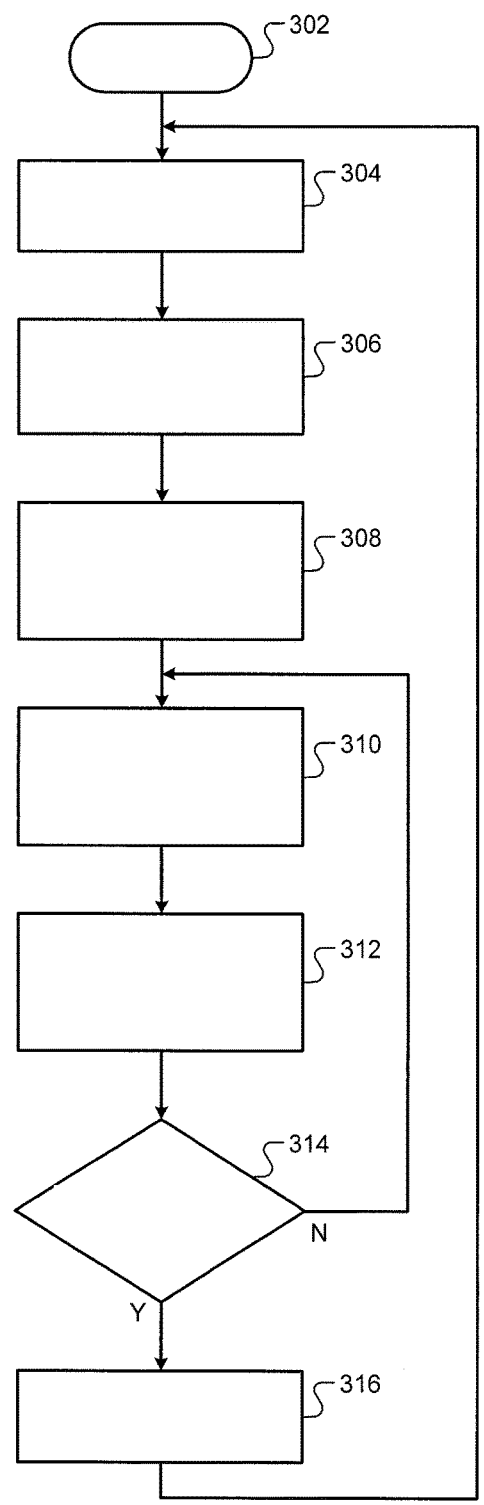
FIG. 3 is a flowchart illustrating an example control method according to the principles of the present disclosure.

Referring now to FIG. 3, a method for controlling a firing sequence of an engine to reduce vibration when cylinders of the engine are deactivated begins at 302. At 304, the method determines firing sequence options. The method may determine the firing sequence options based on the number of cylinders that are deactivated.

At 306, the method estimates torque pulses of firing and non-firing cylinders. The method may estimate the torque pulses based on engine operating conditions such as manifold pressure, engine speed, spark timing, and/or valve timing. When estimating the torque pulses, the method may assume that each firing cylinder produces the same torque pulse and each non-firing cylinder produces the same torque pulse. However, the method may not make this assumption if greater accuracy is desired.

The duration of each torque pulse may correspond to a period of a thermodynamic cycle within a cylinder. For example, for a four-stroke engine, the duration of each torque pulse may correspond to two crankshaft revolutions. The torque pulses may start before an intake stroke when a piston in a cylinder is at TDC. Alternatively, the torque pulses may start before an exhaust stroke when a piston in a cylinder is at BDC.

At 308, the method predicts the response of multiple (e.g., five) vibration modes of a vehicle to each torque pulse in a firing sequence option. The method may predict the response of each mode to each torque pulse based on modal characteristics of the vehicle, including its modal frequencies and damping ratios. The method may predict the response of each mode to each torque pulse based on a predetermined relationship between crankshaft torque and the modal response. The predetermined relationship may be developed through laboratory testing and/or computer-aided simulation, and may be embodied in an equation and/or a lookup table. In various implementations, the predetermined relationship may be embodied as an impulse response function such as a unit impulse response function.

The method may predict the vibration response at one or more locations on the vehicle. For example, the method may predict the vibration response at a driver interface component such as a seat, pedal, or a steering wheel. The method may predict the vibration response in one or more directions. For example, the method may predict the vibration response in the longitudinal, lateral, and/or vertical directions.

A vibration mode is characterized by its modal frequency and its modal shape or direction (e.g., bending, torsional). The amplitude of the vibration in each direction is directly proportional to the modal response. Thus, the method may predict the amplitude of vibration in each direction by determining the product of the modal response and a multiplier, which may be unique for each direction.

The method may predict the response of each mode to each torque pulse in a firing sequence option by convolving each torque pulse with a unit impulse modal response function. In some cases, a torque pulse and the unit modal response function may be convolved once and the resulting modal response may be stored for repeated use. Then, when the engine operating conditions are the same as or similar to those yielding the torque pulse, the stored modal response may be retrieved from memory instead of estimating a torque pulse and then predicting a modal response to the torque pulse.

At 310, the method determines the timing of the response of each mode to each torque pulse in a firing sequence option. The method may determine the timing of the modal responses based on the crankshaft position and the engine speed. At 312, the method sums the modal responses to the torque pulses in a firing sequence option to yield a modal response of the firing sequence option. The method adds the modal response of the firing sequence option to the modal responses of previous firing sequences to yield a total vibration response associated with the firing sequence option.

The total vibration modal response may be expressed in terms of a single value. For example, the total vibration modal response may be expressed as a maximum peak-to-peak value of the total vibration modal response. Additionally or alternatively, the total vibration modal response may be expressed as a ratio of the total vibration modal response to a predetermined vibration modal response. Various other vibration criteria may be used to quantify the total vibration modal response.

At 314, the method determines whether the modal responses are predicted for each firing sequence option. If the modal responses are predicted for each firing sequence option, the method continues at 316. Otherwise, the method continues at 310. At 316, the method selects one of the firing sequence options based on the predicted modal responses. The method may optimize the firing sequence to maximize fuel economy and minimize vibration while satisfying torque demand.

Figure 4:
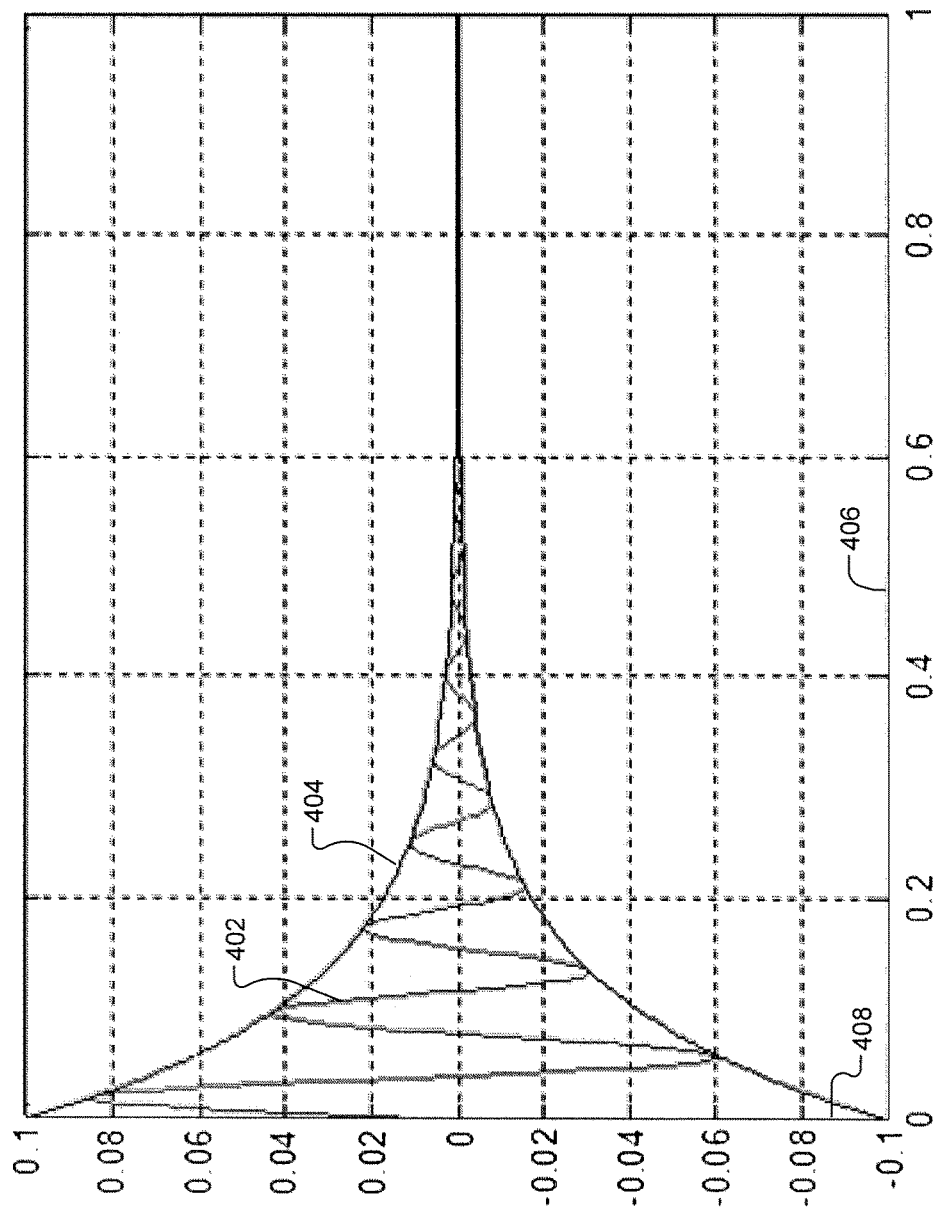
FIGS. 4 through 11 are graphs illustrating example torque pulse signals and vehicle vibration response signals according to the principles of the present disclosure.

Referring now to FIG. 4, an example of a unit impulse response of a vehicle to a crankshaft torque at a given location and for a given mode is illustrated at 402. The unit impulse response 402 and an envelope 404 of its amplitude are plotted with respect to an x-axis 406 and a y-axis 408. The x-axis 406 represents time in seconds. The y-axis 408 represents acceleration in meters per second squared (m/s2).

The unit impulse response 402 is determined for one natural vibration mode of the vehicle. The unit impulse response 402 may be obtained by computer-aided simulation (e.g., finite element analysis) and/or laboratory testing (e.g., physical measurements). The unit impulse response 402 varies for different modes and different measurement points on the vehicle body and with the direction of vibration measured.

The unit impulse response 402 characterizes a mode having a natural frequency of 13 hertz (Hz) and a damping ratio of 0.05 (i.e., 5 percent). The envelope 404 of the unit impulse response 402 decays smoothly, making the envelope 404 easy to predict when the present amplitude is known. This smooth "ring down" simplifies calculating the vibration response from each mode to a given torque pulse once the torque pulse has ended.

Figure 5:
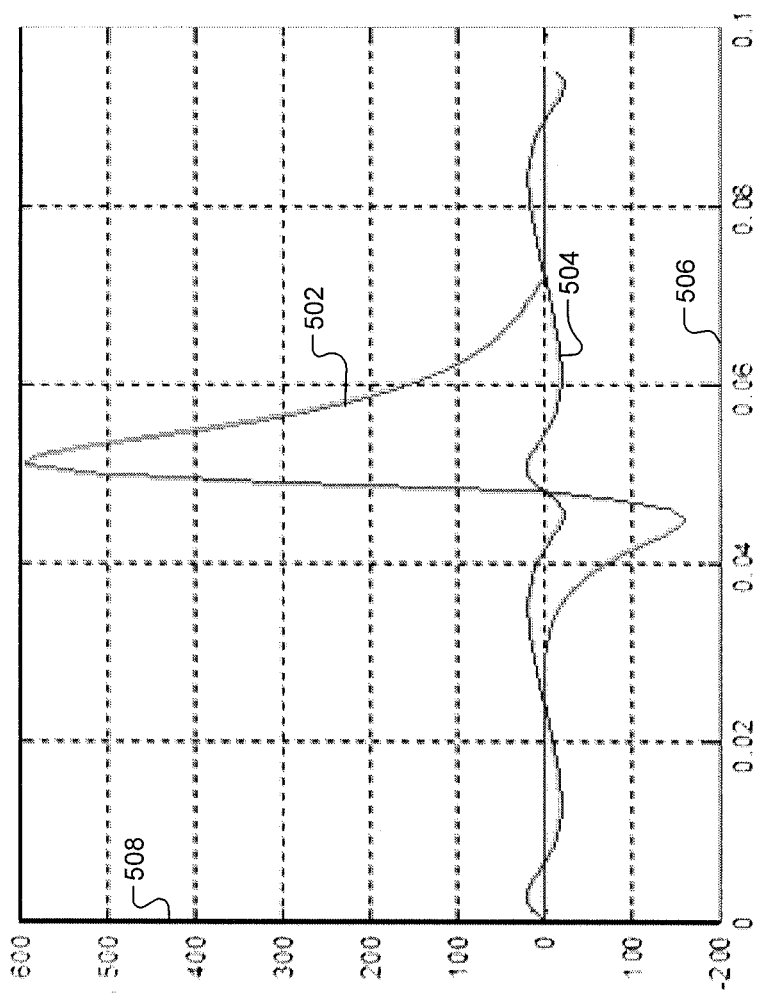

Referring now to FIG. 5, an example of a torque pulse of a firing cylinder in an engine operating at 1250 revolutions per minute (RPM) is illustrated at 502 and an example of a torque pulse of a non-firing cylinder in the engine is illustrated at 504. The torque pulses 502, 504 are plotted with respect to an x-axis 506 and a y-axis 508. The x-axis 506 represents time in seconds. The y-axis 508 represents torque in newton-meters (N-m). The torque pulses 502, 504 last approximately 0.096 seconds. However, as discussed above, torque pulse duration may be based on a predetermined number (e.g., two) of crankshaft rotations, and may therefore depend on engine speed.

Figure 6:
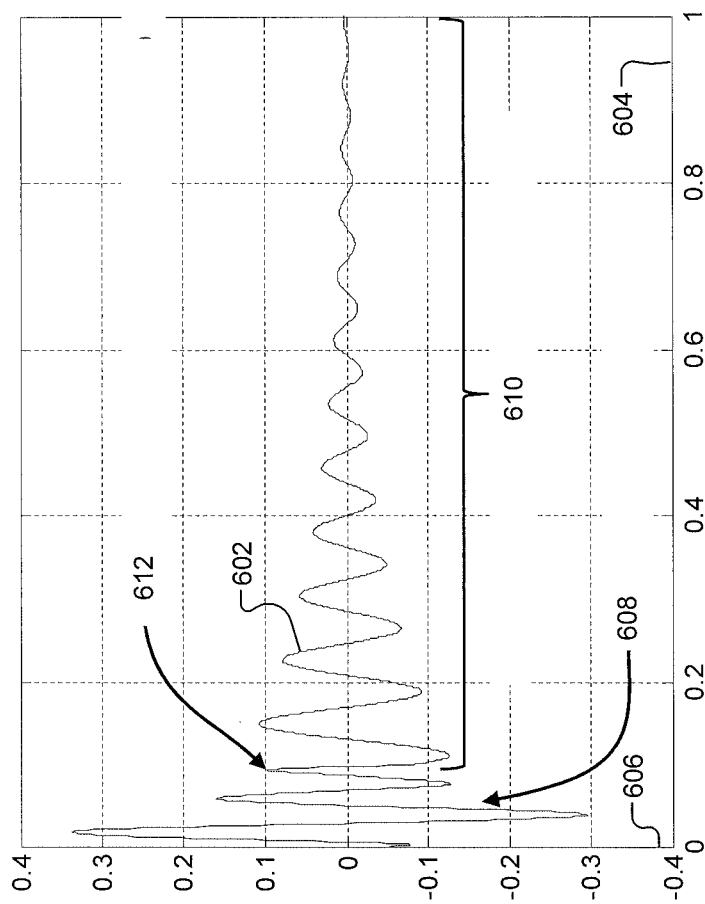

Referring now to FIG. 6, an example vibration response of a mode characterized by the unit impulse response 402 is illustrated at 602. The modal vibration response 602 is due to the torque pulse 502. The modal vibration response 602 is obtained by convolving the torque pulse 502 with the unit impulse response 402. The modal vibration response 602 is plotted with respect to an x-axis 604 and a y-axis 606. The x-axis 604 represents time in seconds. The y-axis 608 represents the amplitude of the modal vibration response 602. The modal vibration response 602 lasts for about a second, as shown in FIG. 6, even though the torque pulse 502 only lasts approximately 0.096 seconds.

The modal vibration response 602 has two distinct parts: a forced response 608 during the application of the torque pulse 502 and a free response 610 occurring afterward. During the forced response 608, the amplitude of the modal vibration response 602 grows from zero, oscillates, and attains some final amplitude at an end 612 of the torque pulse 502. During the forcing, the oscillation of the modal vibration response 602 depends on the frequency content of the torque pulse 502, as well as the natural frequency and damping ratio of the mode.

During the free response 610, the amplitude of the modal vibration response 602 starts at the amplitude at the end of the forcing, and from there oscillates in an exponentially decaying sinusoid that follows a simple equation. The frequency of the sinusoid is equal to the natural frequency of the mode. The rate at which the free response 610 decays depends on the damping ratio of the mode. A higher damping ratio yields faster decay.

Once modal responses are obtained for firing and non-firing torque pulses, the modal response from a series of torque pulses spaced in time may be calculated. For example, in an even-firing four-stroke V8, torque pulses are spaced at 90 degree intervals of crankshaft angle, or 0.0125 seconds at 1200 RPM.

Figure 7:
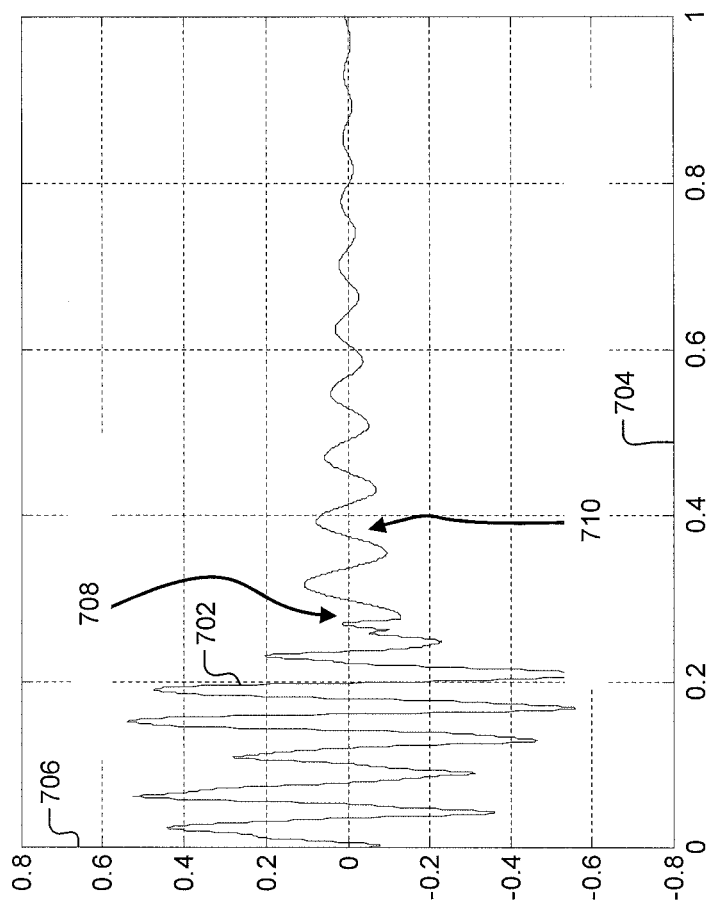

Referring now to FIG. 7, an example of a modal vibration response of a vehicle due to 13 torque pulses in a V8 engine operating at 1200 RPM is illustrated at 702. The vibration response 702 is plotted with respect to an x-axis 704 and a y-axis 706. The x-axis 704 represents time in seconds. The y-axis 706 represents the amplitude of the modal response 702.

The V8 engine has a firing pattern of 1-1-0-1-1-1-0-1-1-0-1-1-0, where "1" denotes firing and "0" denotes non-firing. The pattern is random, with 5.54 of 8 cylinders firing, on average, every 2 revolutions. The torque pulses occur during 5 crankshaft revolutions between 0 and 0.250 seconds. During this period, the modal response 702 builds up to a highly modulating vibration, with peak amplitudes at 0.05 and 0.15 seconds. This vibration level is greater and more irregular than that produced by an even-firing V8. At 708, the torque pulses end and the modal response 702 starts to decay to zero in an exponentially decaying sinusoid that forms a free response 710.

Once a modal response is obtained, the vibration caused by the modal response can be calculated for any response location and direction in a vehicle (e.g., seat track fore-aft, seat track lateral, steering wheel fore-aft). The complete vibration, including all modes, can be found by adding the contributions from each mode at a given location and direction.

Figure 8:
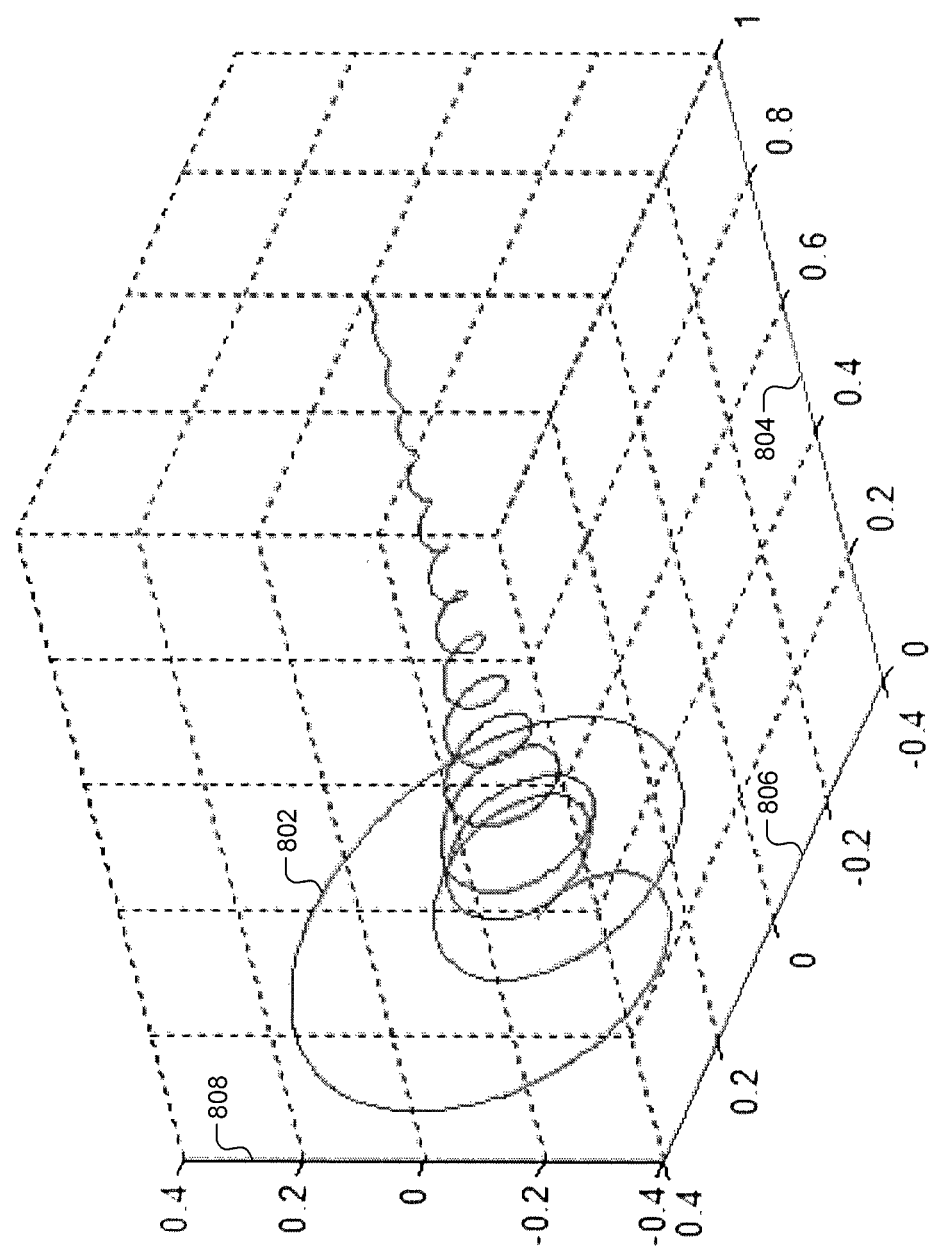

Referring now to FIG. 8, a complex representation of the modal response 702 is illustrated at 802. In noise and vibration analysis, the magnitude and phase of an oscillating motion are often represented in complex form instead of directly in sinusoids. This allows for easy addition of numerous sinusoidal response traces (such as from numerous torque pulses) without explicitly using trigonometric functions.

The complex representation 802 is plotted with respect to an x-axis 804, a y-axis 806, and a z-axis 808. The x-axis 804 represents time in seconds. The y-axis 806 represents the real component of the modal amplitude, which is illustrated in FIG. 7. The z-axis 808 represents the imaginary component of the modal amplitude.

The complex representation 802 may be modeled with a relationship such as $$\eta = Ae^{i\theta} = A*(\cos\theta + i*\sin\theta) \qquad (1)$$

where $\eta$ is the modal response 702, A is the instantaneous magnitude of the modal response 702, $\theta$ represents the phase angle of the modal response 702, $A\cos\theta$ represents the real component of the modal response 702, and A sin θ represents the imaginary component of the modal response 702. Relationship (1) is derived using Euler's formula, which is $$e^{i\theta} = \cos\theta + i*\sin\theta \quad (2)$$

The real component of the modal amplitude can also be expressed as $$y = Re(\eta) = A*(e^{i\theta} + e^{-i\theta})/2 \quad (3)$$

In addition, the imaginary component of the modal amplitude can be expressed as $$z = Im(\eta) = A*(e^{i\theta} - e^{-i\theta})/2i \quad (4)$$

Figure 9:
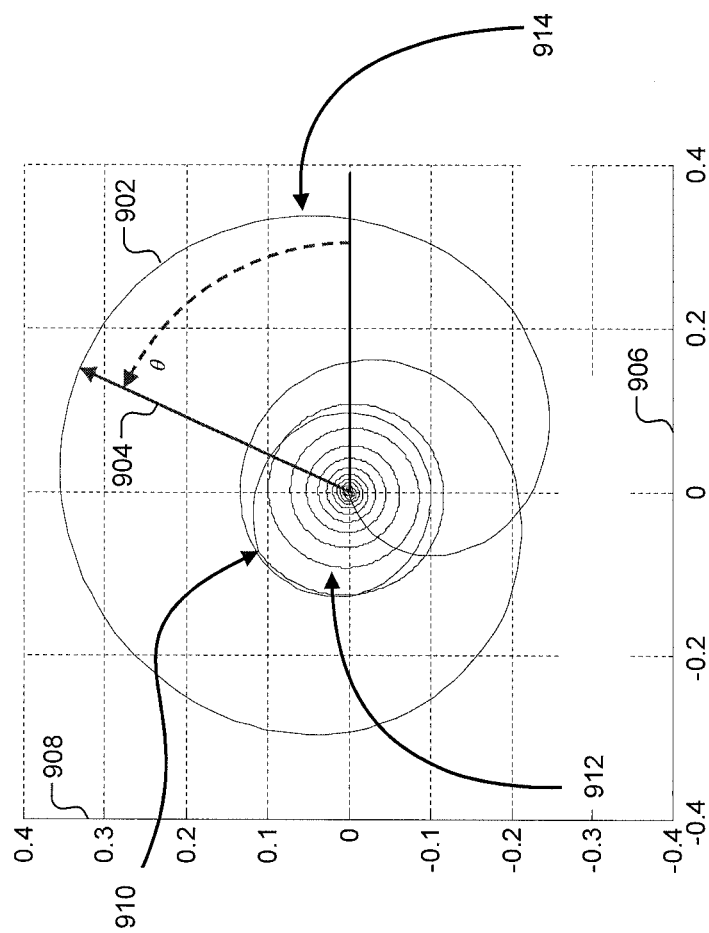

Referring now to FIG. 9, an end view of the complex representation 802 from the perspective of a point on the x-axis 804 is illustrated at 902. It may be beneficial to view the complex representation 802 parallel to the x-axis 804, as shown in FIG. 9, so that only the real and imaginary components of the modal response 702 are shown. This illustrates the rotating nature of modal vectors such as a modal vector 904. The end view 902 and the modal vector 904 are plotted with respect to an x-axis 906 and a y-axis 908. The x-axis 906 represents the real component of the modal response 702. The y-axis 908 represents the imaginary component of the modal response 702.

The modal response caused by a single torque pulse starts at zero (0, 0) and generally spirals outward as the torque pulse excites the mode. However, the amplitude does not always increase during this time, depending on the frequency content of the torque pulse relative to the modal frequency. At 910, the torque pulse ends and the modal response transitions from a forced response 912 to a free response 914. At the point of the transition, the complex amplitude is (−0.07, 0.12).

After the end of the torque pulse, the modal response immediately begins a spiral toward the center of the diagram (0, 0). The real component of the spiral is the exponentially decaying sinusoid illustrated in FIG. 7. At the transition between the forced response 912 and the free response 914, there is a visible kink in the trace.

At any moment in time, the instantaneous complex amplitude may be expressed as a vector. The modal vector 904 represents the response at a given time and can expressed as "0.64+i 1.42" or as "magnitude 1.56 at angle 65.7 degrees." FIG. 9 shows modal amplitude in detail. However, the modal amplitude may be tracked at evenly spaced intervals, such as 90 degrees of crankshaft rotation.

Figure 10:
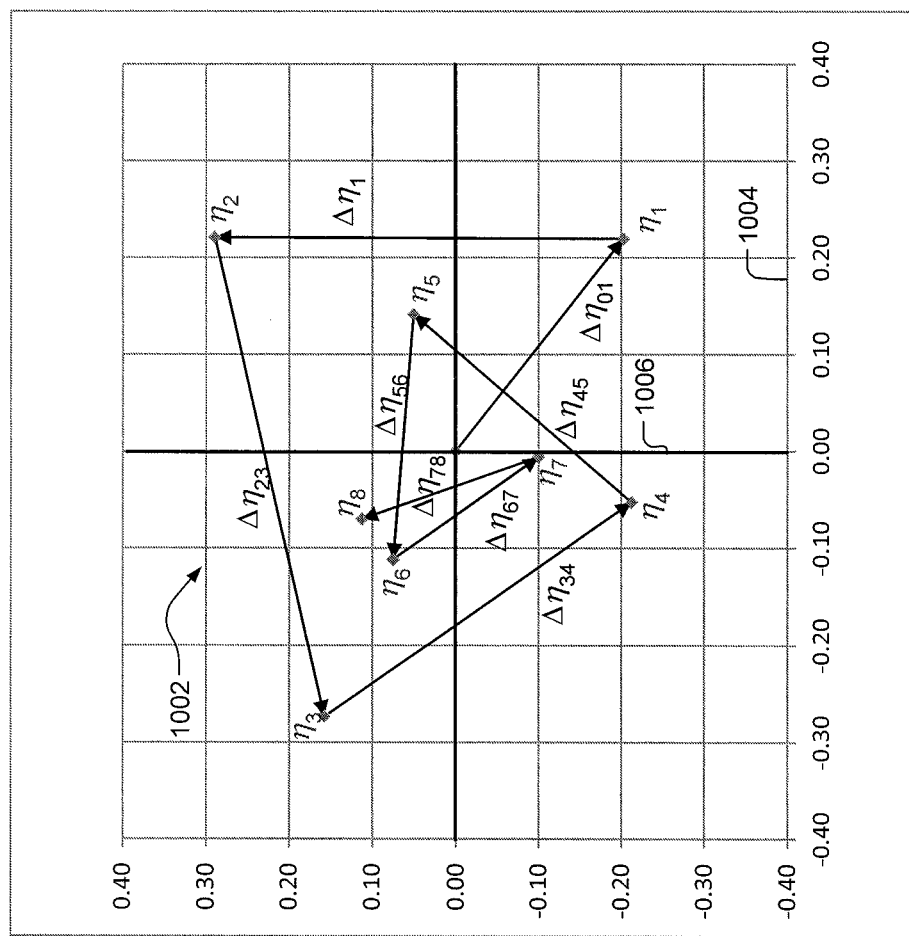

Referring now to FIG. 10, an end view 1002 is similar to the end view 902 except that, instead of showing the modal response in detail, the end view 1002 illustrates the motion at every 90 degrees of crankshaft rotation. In addition, FIG. 10 only shows the modal vector during the torque pulse excitation. The end view 1002 is plotted with respect to an x-axis 1004 and a y-axis 1006. The x-axis 1004 represents the real component of the modal amplitude. The y-axis 1006 represents the imaginary component of the modal amplitude.

FIG. 10 assumes that the initial modal amplitude is zero and illustrates a cumulative change in the modal vector from the initial complex amplitude. At each point in time, the end of the current vector (originating from (0, 0)) is labeled as $\eta_1, \eta_2 \ldots$ and shown as a dot, while each change is labeled as $\Delta\eta_{01}, \Delta\eta_{12} \ldots$ and shown as an arrow.

In this example, the modal response oscillates slower than the crank rotates (a 13 Hz mode versus a 20 Hz crank speed), so as the crank rotates 90 degrees, the 13 Hz motion only moves through 58.4 degrees of phase (360-degree phase is one oscillation). However, during forcing, this oscillation also depends on the characteristics of the torque pulse applied.

FIG. 10 shows a way to predict the change in modal amplitude resulting from each torque pulse in uniform steps of the crank angle. Changing the spacing steps may produce a different change in modal amplitude between steps. For example, switching from 90 degrees to 30 degrees may produce smaller steps in the amplitude. However, the end effect over two crank revolutions may still be the same. The crank angle interval between steps chosen may be small enough to adequately describe the activity of important modes (e.g., to find peaks and avoiding aliasing).

Once the torque pulse is complete, the portion of the modal amplitude caused by the torque pulse exponentially decays. Thus, if shown, the amplitude at Step 9 would be rotated counterclockwise by 58.4°, and have a slightly smaller magnitude relative to the amplitude at Step 8. As more time passed, the modal amplitude would be represented by a coarser form of the exponential spiral decay illustrated in FIG. 9.

Figure 11:
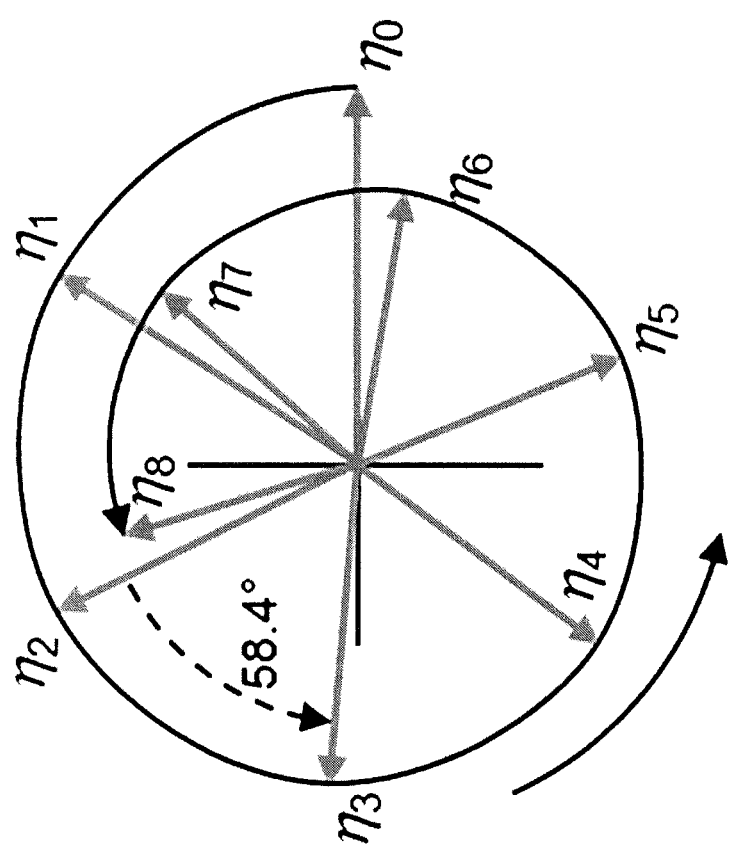

Referring now to FIG. 11, the exponential decay of the 13 Hz mode after torque pulses are complete is shown in 90 degree crankshaft intervals. The modal vector starts at (1, 0). The modal vector at each step is labeled as $\eta_1, \eta_2 \ldots$ and shown by an arrow. The foregoing discussion provides a way to evaluate the effect of a torque pulse on a mode when the torque pulse is applied and after the torque pulse is applied.

Table 1 (below) shows the change in the complex amplitude (real and imaginary parts) of the 13 Hz mode while the torque pulse is active similar to FIG. 10. However, instead of tracking the cumulative effect of the torque pulse, the individual changes between the torque pulses are listed.

TABLE 1

| Steps | Amplitude Change | |
|---|---|---|
| | Real | Imaginary |
| 0 to 1 | 0.220 | −0.203 |
| 1 to 2 | 0.001 | 0.492 |
| 2 to 3 | −0.494 | −0.132 |
| 3 to 4 | 0.221 | −0.370 |
| 4 to 5 | 0.195 | 0.263 |
| 5 to 6 | −0.253 | 0.024 |
| 6 to 7 | 0.105 | −0.175 |
| 7 to 8 | −0.064 | 0.213 |

Using the known changes in each step from Table 1, a table may be produced that assembles the effect of the torque pulses, along with the effect of damping on the previous accumulated response.

Referring now to FIG. 12, a table shows the progression of the amplitude of the 13 Hz mode and the effects of each torque pulse. Crank angle is indicated by the row labeled 1202, step number is indicated by the row labeled 1204, torque pulses are labeled 1206 through 1220, forced response is indicated by the row labeled 1222, and decaying response is indicated by the row labeled 1224. The table of FIG. 12 shows the modal amplitude at each step, indicated by the row labeled 1226, as the modal amplitude is changed by the torque pulses. The initial amplitude (the modal amplitude at Step 0) is (1.0, −0.5). The real components at each step are indicated by the column labeled 1228, and the imaginary components at each step are indicated by the column labeled 1230.

The last pulse (pulse 1220) occurs at a crank angle of 0 degrees, but its effect is first seen at a crank angle of 90 degrees and its forcing effects last until a crank angle of 720 degrees. Previous pulses (pulses 1206 through 1218) have only part of their excitation left. The corresponding effect of every other torque pulse is shaded. Each pulse is shifted in time by 90 degrees from the previous pulse, per the cylinder spacing. All cylinders are firing, but the pulse 1220 is the last pulse to be considered in this "baseline" vibration prediction. The "baseline" response is the predicted response, including only the cylinders that have been selected to fire/not-fire up to that point.

Two factors determine the modal amplitude at each 90-degree step: 1) the change in modal amplitude caused by the forcing functions (each torque pulse); and 2) the cumulative modal amplitude at the previous step, after it has rotated in phase per the modal frequency, and decayed per the damping ratio. The first factor (forced) is in the third to the last row (row 1222). It is the sum of all the effects of the torque pulses in the corresponding column. The second factor (decay) is in the second to last row (row 1224). It is the modal amplitude (row 1226) from the previous step with the appropriate phase and damping applied. At each step, the real and imaginary parts of the forced and decay responses (the second and third to last rows—rows 1222 and 1224) are added to yield the modal amplitude (the last row—row 1226)

This baseline response may be added to the response from future cylinder event sequences, and the result may be an increased or decreased modal amplitude, depending on the pattern chosen. The baseline response, after the forced response of the torque pulses, is simply the exponential decay of the accumulated response. The amplitude in Step 9 in the table of FIG. 12 is the amplitude from Step 8, rotated and decayed. This is repeated every step (every 90 degrees in this example), as far out as necessary to accommodate the optimization routine. Note that because of the simple decaying motion of an individual mode, the future amplitude of the mode in the baseline response is known, from the response in Step 8. No other information about previous firings is necessary to predict the future baseline response. This is in contrast to using standard convolution, which has a much more complicated impulse response.

Figure 13:
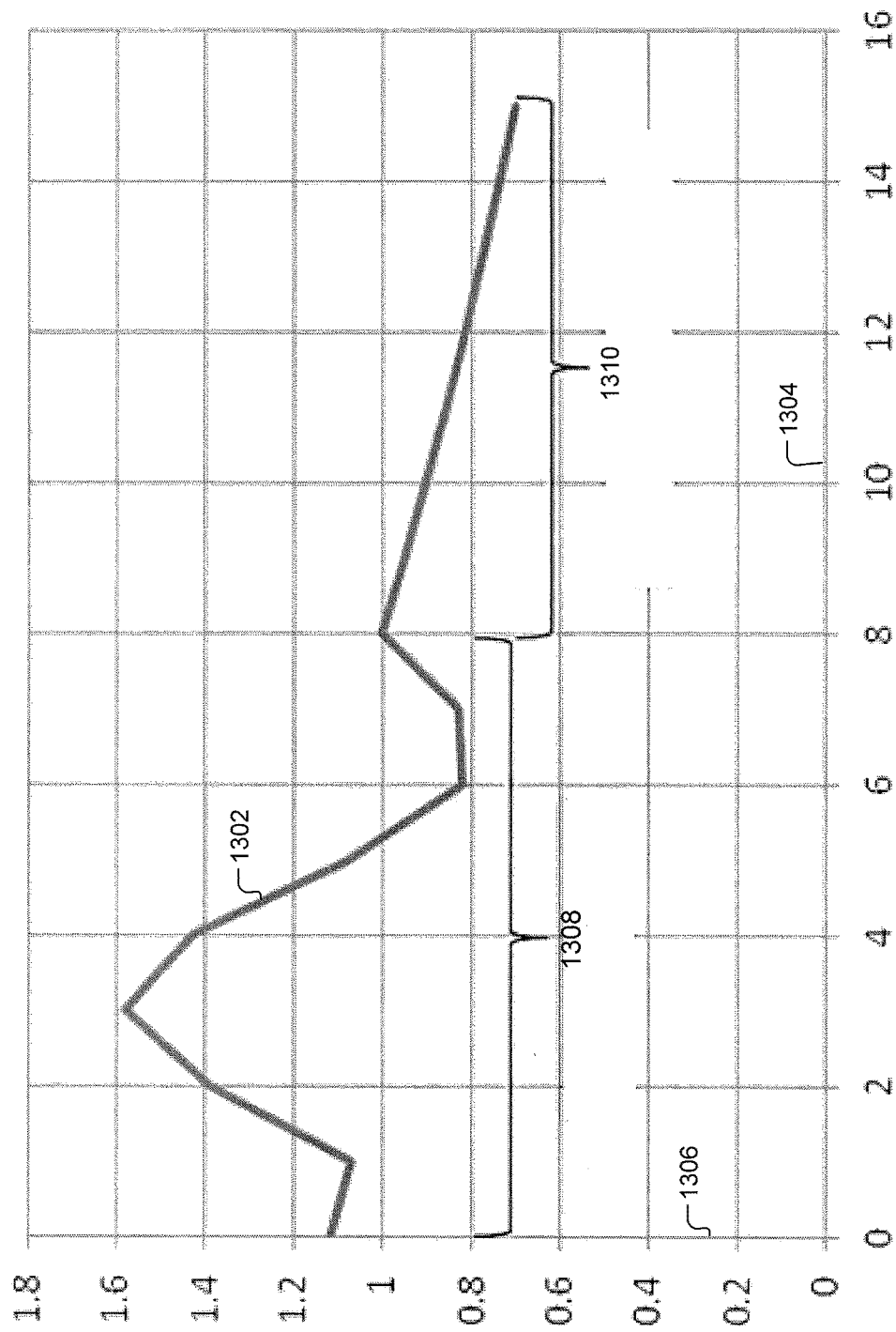
FIGS. 13 and 14 are graphs illustrating example vehicle vibration responses according to the principles of the present disclosure.

FIG. 13 plots a magnitude of the modal vector for the baseline response in the table of FIG. 12, but carried out to 15 steps instead of 9. The magnitude of the modal vector is indicated at 1302 and is plotted with respect to an x-axis 1304 that represents step number and a y-axis 1306 that represents magnitude. The magnitude oscillates considerably during the forcing, indicated at 1308, ending up slightly smaller at the end (Step 8). This is followed by the smooth decay, indicated at 1310.

Once the baseline response for the mode is found, the modal amplitude is forecast for several different firing patterns being considered at that time, based on torque demand, etc. To forecast the modal amplitude, the induced response caused by each firing pattern may be added to the above baseline response. This may involve taking the baseline response table as shown, and creating an additional table for each firing sequence under consideration. This process may be done for each mode, each with its own frequency and damping.

Figure 14:
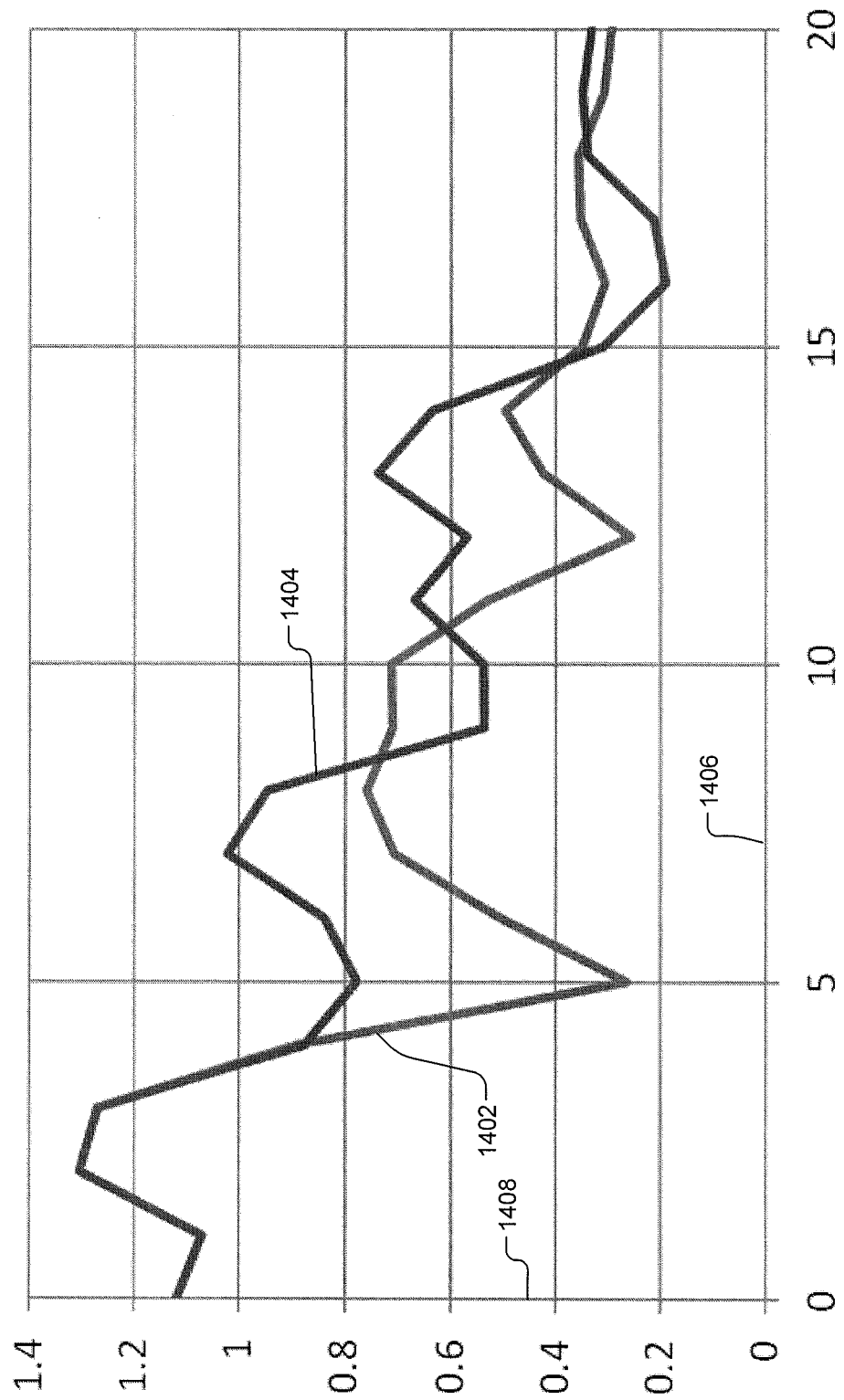

FIG. 14 show the results from two possible follow-up firing sequences, indicated at 1402 and 1404, each being added to the baseline response of FIG. 13. The firing sequences 1402, 1404 are plotted with respect to an x-axis 1406 that represents step number and a y-axis 1408 that represents magnitude. Each follow-up pattern fires 6 times in 11 possible firings. The firing sequence 1402 has a firing pattern of 0-1-1-0-1-0-1-0-1-1-0, and the firing sequence 1404 has a firing pattern of 0-1-0-1-1-0-1-0-1-1-0, where "1" denotes firing and "0" denotes non-firing. While the amplitudes of the firing sequences 1402, 1404 up to Step 4 are virtually identical, past Step 5 the firing sequences 1402, 1404 are much different in their magnitude variation.

In actual practice, there may be more options tested, and larger differences seen. Also, this may not be done for just one mode. All other significant modes may be treated similarly, and a given firing pattern may be likely to smooth some modes and aggravate others. This is part of the trade-off in the vibration metric.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:
1. A system comprising:
a vibration prediction module that predicts a modal response of a vehicle based on a firing sequence of an engine when a cylinder of the engine is deactivated, wherein the firing sequence indicates a firing order of the engine and indicates which cylinders of the engine are active; and a firing sequence module that adjusts the firing sequence of the engine based on the predicted modal response of the vehicle.

2. The system of claim 1 wherein the vibration prediction module predicts the modal response based on torque pulses of firing cylinders and non-firing cylinders in the firing sequence.

3. The system of claim 2 wherein the vibration prediction module:
predicts the modal response for each torque pulse;
determines the timing of the modal response for each torque pulse; and
sums portions of the modal responses that overlap in time to yield the modal response of the firing sequence.

4. The system of claim 3 further comprising a torque pulse module that estimates the torque pulses based on a pressure within an intake manifold of the engine and engine speed.

5. The system of claim 2 wherein the vibration prediction module predicts the modal response of each torque pulse based on a predetermined relationship between crankshaft torque and modal response.

6. The system of claim 2 wherein, for each of the torque pulses, the vibration prediction module predicts the modal response for multiple vibration modes based on a modal characteristic of the vehicle.

7. The system of claim 6 wherein, for each of the vibration modes, the vibration prediction module predicts an amplitude of vibration in multiple directions based on the modal response and a multiplier.

8. The system of claim 7 wherein the vibration prediction module determines a total vibration in each direction by summing the corresponding vibration amplitudes of all of the vibration modes.

9. The system of claim 1 wherein:
the vibration prediction module predicts the modal response of the vehicle corresponding to multiple firing sequence options; and
the firing sequence module selects one of the firing sequence options based on the predicted modal response of the vehicle.

10. The system of claim 9 wherein the vibration prediction module:
determines a first modal response for a previous firing sequence;
predicts a second modal response for each of the firing sequence options;
determines a total modal response for each of the firing sequence options based on the first modal response and the corresponding second modal response; and
selects one of the firing sequence options based on the total modal response.

11. A method comprising:
predicting a modal response of a vehicle based on a firing sequence of an engine when a cylinder of the engine is deactivated, wherein the firing sequence indicates a firing order of the engine and indicates which cylinders of the engine are active; and
adjusting the firing sequence of the engine based on the predicted modal response of the vehicle.

12. The method of claim 11 further comprising predicting the modal response based on torque pulses of firing cylinders and non-firing cylinders in the firing sequence.

13. The method of claim 12 further comprising:
predicting the modal response for each torque pulse;
determining the timing of the modal response for each torque pulse; and
summing portions of the modal responses that overlap in time to yield the modal response of the firing sequence.

14. The method of claim 13 further comprising estimating the torque pulses based on a pressure within an intake manifold of the engine and engine speed.

15. The method of claim 12 further comprising predicting the modal response of each torque pulse based on a predetermined relationship between crankshaft torque and modal response.

16. The method of claim 12 further comprising, for each of the torque pulses, predicting the modal response for multiple vibration modes based on a modal characteristic of the vehicle.

17. The method of claim 16 further comprising, for each of the vibration modes, predicting an amplitude of vibration in multiple directions based on the modal response and a multiplier.

18. The method of claim 17 further comprising determining a total vibration in each direction by summing the corresponding vibration amplitudes of all of the vibration modes.

19. The method of claim 11 further comprising:
predicting the modal response of the vehicle corresponding to multiple firing sequence options; and
selecting one of the firing sequence options based on the predicted modal response of the vehicle.

20. The method of claim 19 further comprising:
determining a first modal response for a previous firing sequence;
predicting a second modal response for each of the firing sequence options;
determining a total modal response for each of the firing sequence options based on the first modal response and the corresponding second modal response; and
selecting one of the firing sequence options based on the total modal response.

21. The system of claim 1 wherein:
the vibration prediction module predicts an amplitude of vibration for multiple vibration modes based on the firing sequence and a modal characteristic of the vehicle; and
each vibration mode is characterized by a modal frequency and a modal direction.

22. The method of claim 11 further comprising predicting an amplitude of vibration for multiple vibration modes based on the firing sequence and a modal characteristic of the vehicle, wherein each vibration mode is characterized by a modal frequency and a modal direction.

23. The system of claim 1 wherein the modal response includes an amplitude of a vibration mode and a phase of the vibration mode.

24. The method of claim 11 wherein the modal response includes an amplitude of a vibration mode and a phase of the vibration mode.

* * * * *